Nov. 5, 1968
K. J. CLEEREMAN ET AL
3,409,709
FILL POINT DETERMINATION
Filed July 23, 1964
2 Sheets-Sheet 1
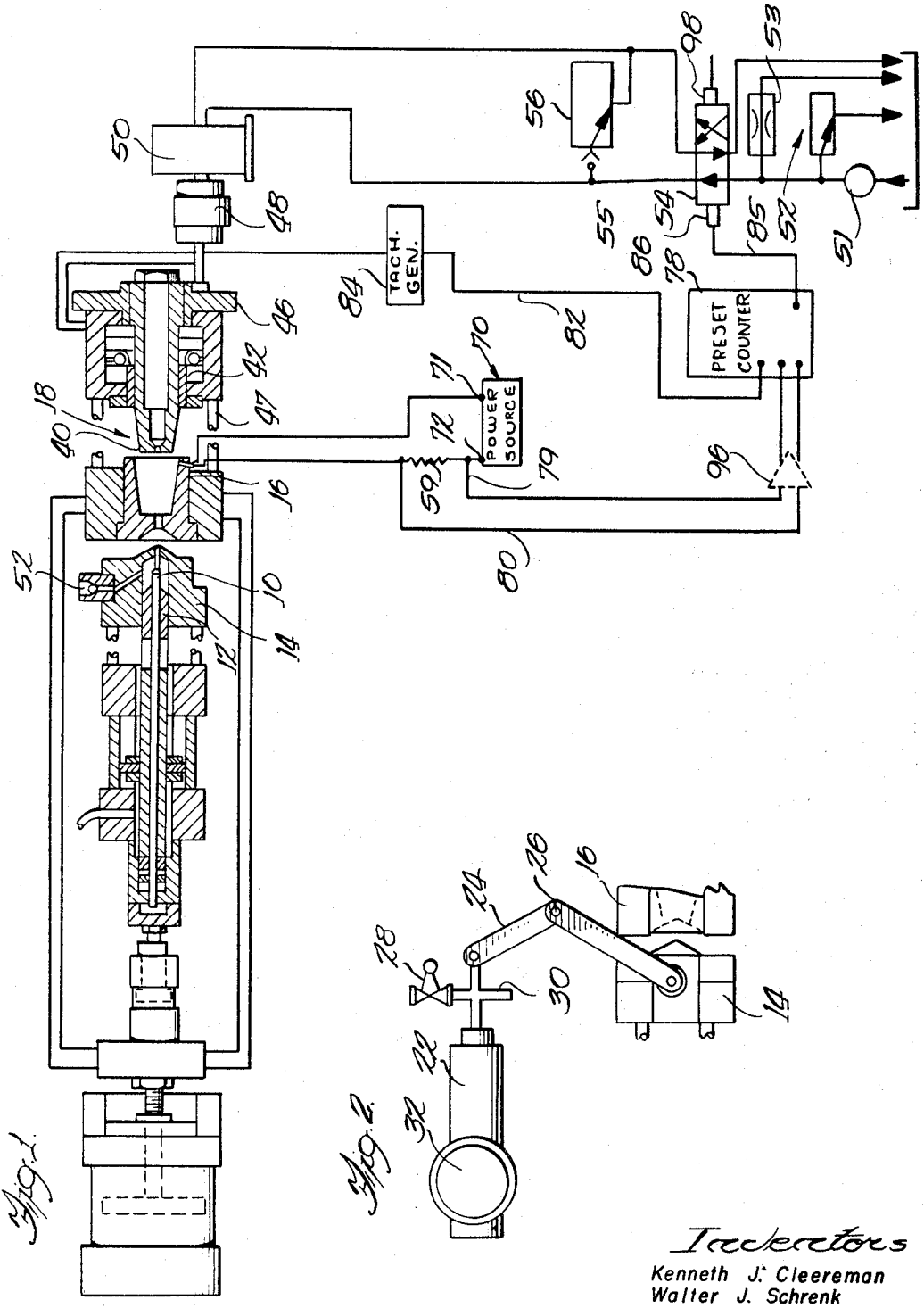
Inventors
Kenneth J. Cleereman
Walter J. Schrenk
Paul C. Woodland
Dominik & Stein
Attorneys

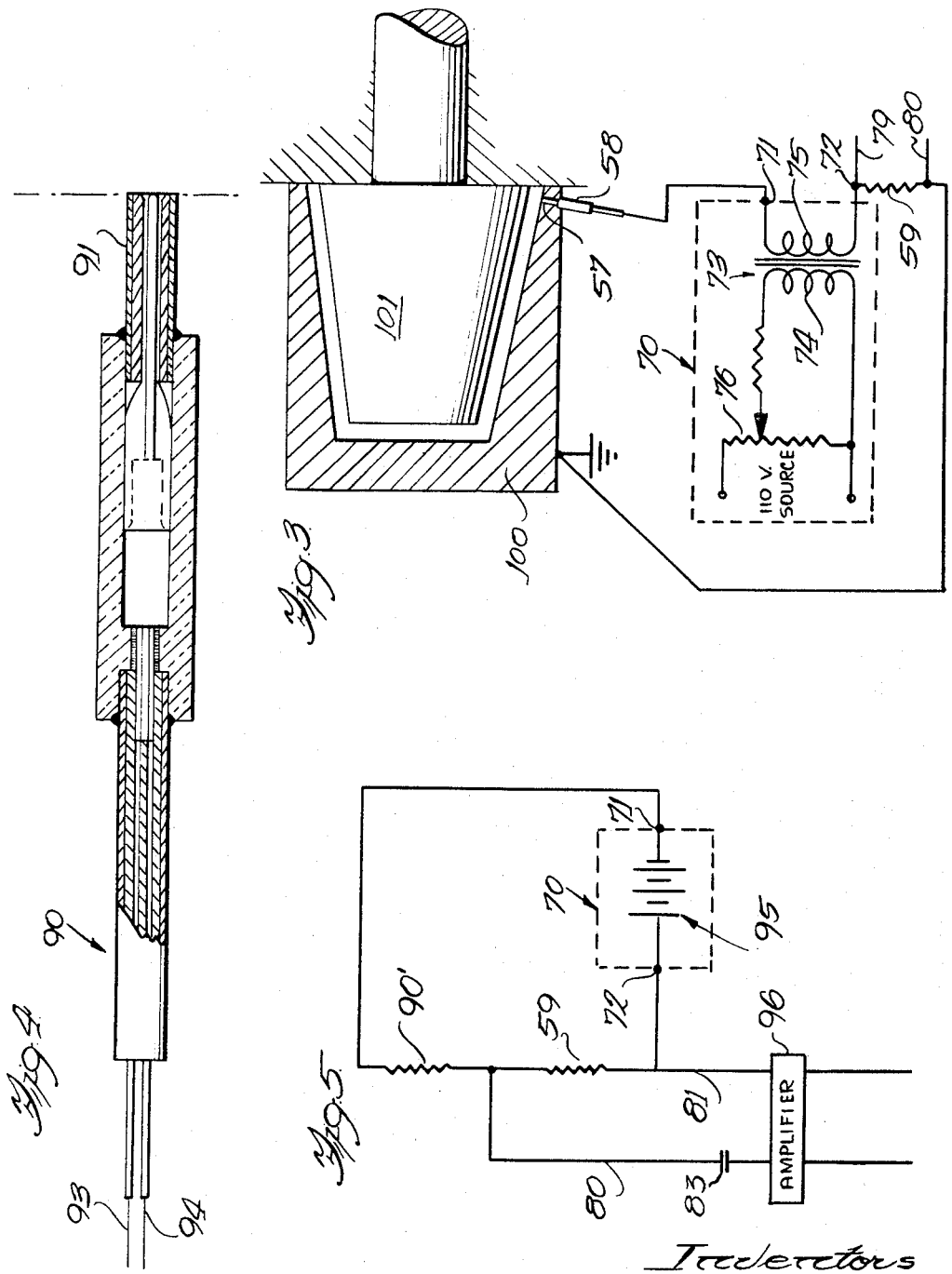

United States Patent Office 3,409,709
Patented Nov. 5, 1968

3,409,709
FILL POINT DETERMINATION
Kenneth J. Cleereman, Midland, Walter J. Schrenk, Bay City, and Paul C. Woodland, Midland, Mich., assignors to The Dow Chemical Company, Midland, Mich., a corporation of Delaware
Filed July 23, 1964, Ser. No. 384,664
16 Claims. (Cl. 264—40)

ABSTRACT OF THE DISCLOSURE

According to the method of the present invention, a thermoplastic article having rotational symmetry with a high multi-direction orientation for high strength in all directions is injected molded by injecting molten thermoplastic into a closed mold with a cavity which defines the article while applying a rotation force, by means of a hydraulic motor, to one element of the closed mold. A sensing device in the form of an electrode or a thermistor within the mold cavity detects when the mold cavity is filled and generates a signal which is used to activate control means that count the number of revoltuions of the rotated elements of the mold. The control means, in turn, generate a signal after a predetermined number of revolutions of the rotated element, which signal is used to operate a valve which controls the fluid flow to the hydraulic motor, to terminate the rotation force. The mold is then opened and the article removed.

---

This invention relates to molding techniques for molding products of rotational symmetry wherein multi-directional orientation is automatically imparted to the plastic material used to mold the product. More particularly, the invention relates to apparatus for uniquely accomplishing said molding technique, which may be both injection molding or impact molding.

According to the above mentioned co-pending applications, when hollow plastic products, all or a portion of which have rotational symmetry, are molded while one of the mold elements forming said rotational symmetry portion is rotated with a torque of a level which permits continued rotation after the mold cavity is filled but is insufficient to overcome the resistant forces generated by the thermoplastic when it reaches its second order transition point (the point of solidification), the molecules therein will attain a high degree of multi-directional orientation in a layer like helicoidal pattern of molecular thickness through the wall of said article. At such level of torque, the orientation is frozen into the article so that it will thereafter possess multi-directional strength. To define the torque level in another way, the torque should be sufficient to cause continued rotation of the rotatable element for a short time after the mold cavity is filled, but insufficient to damage or prevent solidification of the molded article.

While the above mentioned methods provide satisfactory results, it would be advantageous to be able to determine the precise time that the mold cavity is filled and to rotate the rotatable element of the mold cavity for a predetermined time or for a predetermined number of revolutions after it is filled. This would provide for more positive control, and the desired multi-directional orientation can therefore be more easily obtained, regardless of the type of thermoplastic material used.

Sensing devices for detecting the fill point of a mold have been devised, however, each of these sensing devices have not been entirely satisfactory, for one reason or another. For example, mechanical devices such as microswitches which rely on small motions to energize the microswitch have been used, but they are relatively complex and do not have the very fast response time which is necessary. Strain gauge pressure transducer has also been used to sense the pressure rise when the mold is filled, but the pressure transducers commercially available are expensive and fairly large, thus limiting their applicability. Thermocouple sensors also have been used to sense a temperature rise, but the response time of this type of sensor is too slow.

It is therefore an object of the present invention to provide a molding technique for molding products of rotational symmetry wherein multi-directional orientation is automatically imparted to the plastic material used to mold the product.

It is a further object of the invention to provide improved molding apparatus for accomplishing the above-mentioned molding technique.

It is a still further object of the invention to provide improved methods and apparatus for sensing when a mold cavity is filled.

A corresponding and equally imporant object is to provide improved methods and apparatus for controlling the continued rotation of the rotatable element of a mold for a predetermined time, or number of revolutions, after the mold is filled.

A still further object is to provide improved apparatus for determining the fill point of a mold cavity which is more reliable, less expensive and has a faster response time than apparatus heretofore available.

Other objects of the invention will be part be obvious and will in part appear hereinafter.

According to the method of the present invention, a thermoplastic article having rotational symmetry with a high multi-direction orientation for high strength in all directions is injected molded by injecting molten thermoplastic into a closed mold with a cavity which defines the article while applying a rotation force, by means of a hydraulic motor, to one element of the closed mold. A sensing device within the mold cavity detects when the mold cavity is filled and generates a signal which is used to activate control means that count the number of revolutions of the rotated element of the mold. The control means, in turn, generate a signal after a predetermined number of revolutions of the rotated element, which signal is used to operate a valve which controls the fluid flow to the hydraulic motor, to terminate the rotation force. The mold is then opened and the article removed.

The improved sensing device, according to a first embodiment of the invention, is an insulated electrode which is placed into the mold cavity so that it is flush with the inside wall surface. A sufficient potential is applied between the electrode and the mold cavity to cause a current flow in a circuit while the mold is empty. The plastic injected or impacted into the mold cavity quenches the current flow when the mold is filled, resulting in a signal which is coupled to the control means to activate it to start counting, in the manner described above.

In accordance with a second, and preferred, embodiment of the invention, the improved sensing device is a thermistor, which is connected in a circuit in substantially the same manner as the electrode. A thermistor is preferred to the electrode, since is gives a much "cleaner" signal which is easier to use to activate the control means.

The control means, as shown and described, is a pre-set counter for counting the revolutions of the rotated element of the mold and for generating a control signal when the rotated element has rotated a predetermined number of revolutions after the mold is filled. A tachometer generator detects and supplies a signal to the pre-set counter, on each revolution of the rotated element. The above described control means may be replaced with a time delay relay means for terminating the rotational force a predetermined time after the mold is filled, in a manner described more fully hereinafter.

The invention accordingly comprises the several steps and the relation of one or more of such steps with respect to each of the others and the apparatus embodying features of construction, combinations of elements and arrangement of parts which are adapted to effect such steps, all as exemplified in the following detailed disclosure, and the scope of the invention will be indicated in the claims.

For a fuller understanding of the nature and objects of the invention, reference should be had to the following detailed description taken in connection with the accompanying drawings; in which:

FIG. 1 is a view showing injecting molding apparatus, in section, with the control mechanism of this invention for determining the fill point of the mold and for controlling the continued rotation of the rotatable element of the mold after the mold cavity has been filled;

FIG. 2 is a top view of an extruder for feeding plastic in fluid condition to the apparatus of FIG. 1;

FIG. 3 is a sectional view of an impact mold cavity showing the electrode and its power source, for determining the fill point of the mold cavity, in accordance with a first embodiment of the invention;

FIG. 4 is a sectional view of a thermistor which may be used with the invention; and FIG. 5 is a schematic diagram of the thermistor (the thermistor being represented by a resistor) and its power source.

Similar reference characters refer to similar parts throughout the several views of the drawings.

Referring now to FIGS. 1 and 2, which illustrate one embodiment of apparatus for the injection molding technique, the apparatus has a nozzle valve 10 and an injection plunger 12, both of which individually reciprocate within injection cylinder 14 to supply a metered amount of fluid thermoplastic material to the mold cavity defined by an outer stationary mold element 16 and an inner mating rotatable mold element 18.

A large hydraulic accumulator (not shown) is preferably used on the forward stroke of the injection plunger 12 to obtain high injection speeds. The injection valve prevents pre-pressurizing of the plastic in the injection cylinder, before it is released to the mold cavity. In deed, it is preferred that this valve be actuated by a second hydraulic system which also utilizes an accumulator (not shown) so that in operation, both the valve accumulator and the plunger accumulator may be precharged to effect a desirable high speed and high pressure operation to the apparatus. Thus, both valves may be simultaneously opened after the mold cavity is closed to provide a controllable and extremely rapid injection speed. Control of this speed along with control over the temperature of the plastic and extrusion, as will be explained hereinafter, allows considerable control over the orientation in the longitudinal direction. Control over orientation in other directions is effected by the unique operation of the rotatable mold element 18.

In the embodiment shown, molten, or more accurately, fluid thermoplastic is fed to the injection cylinder 14, in continuous fashion by extruder 22 (see FIG. 2) by a flexible feed line 24, containing an albow 26 for flexibility. A screw pre-plasticisor can also be used.

To affect accurate control over the pressure of extrusion, feed line 24 contains a relief valve 28 and a pressure control 30 which regulates movement of the ram of the extruder. Raw plastic, usually in bead or pellet form, is fed to the extruder by a hopper 32, the top of which is seen in FIG. 2. Metering is obtained by presetting the stroke of the injection plunger 12. When the injection cylinder 14 is full while the plunger is still retracted, excess plastic is vented out through the relief valve 28. Check valve 52 at the entrance to the injection cylinder 14 prevents the metered amount of polymer within the cylinder from escaping out the vent during the injection stroke of the plunger.

As indicated above, multi-directional orientation of the plastic molecules is effected by the apparatus herein in that one of its mold elements is rotatable and there are controls over the torque applied to said element. In this instance, the male element of the mold cavity is rotatable; however, it should be understood that the female element could likewise be made rotatable.

As shown, the male element 18 comprises the forward end 40 of a mandrel 42, which is rotatably secured within a thrust bearing within block 46. The entire block reciprocates upon slide rods 47 to permit opening and closing of the mold cavity.

Mandrel 42 and likewise the male element 18 is rotated by means of a pre-settable constant torque motor 48 by a gear assembly 50 on the rear or other end of the mandrel 42.

Since it is pre-settable, motor 48 is capable of generating a torque up to a certain level. It should be evident that most any constant torque could be used. A hydraulically operated motor, such as Vickers constant displacement piston motor No. MF 2012–30–61, is a noteworthy example. With such a motor, oil under pressure, generated by a pump 51 which may be a 25 HP Vickers pump, capable of delivering 17 gallons per min. of oil at 2000 p.s.i., is preferably used to supply the hydraulic power. Torque is controlled with a pressure relief valve 52 and the speed is controlled with a flow control valve 53. As an example of the level of torque capable of being applied with a gear reduction of 6 to 1, the motor, driven at a 1500 p.s.i. level, is able to apply a torque of 5400 lbs. per inch on the male element.

Interposed between the motor 48 and the pump 51 is a four-way valve 54 which is used to stop and break the hydraulic drive of motor 48, in a manner to be described hereinafter. A check valve 55 in series with a pressure relief valve 56 are included in parallel with the hydraulic line for maintaining proper hydraulic pressure.

A small aperture 57 sufficiently large to receive a glass insulated electrode 58 is formed in the mold at the furtherest distance from the bottom of the mold. The electrode 58 may be a #24 platinum wire. The glass insulation about the electrode is preferably ground to correspond to the contour of the inside wall of the mold cavity so that when the electrode is inserted into the mold cavity it will be flush with the inside wall thereof. A source of power 70 has one terminal 71 connected to the electrode 58 and another terminal 72 connected to a resistor 59, the other end of the resistor 59 being connected to the mold cavity 16, which is grounded. The source of power 70 for the electrode 58 may be any type source of power capable of providing an output voltage sufficient to cause sparking between the electrode 58 and the mold cavity 16 so that a current flows through the resistor 59.

One such source of power 70 is shown in FIG. 3 and may be any 110 volts source stepped up by means of a 110 volt–15,000 volt step-up transformer 73 which has its primary winding 74 connected to the 110 v. source and its secondary winding 75 connected in series with the electrode 58 and the inductor 59. A variable resistor 76 can be connected across the primary winding 74 for controlling the voltage applied thereto.

When the mold cavity is empty, it will be found that a stepped up voltage of approximately 10,000 volts will cause a high voltage spark between the electrode 58 and the mold cavity, and that approximately 1 milliampere of current will flow through the resistor 59. When the mold cavity is filled with thermoplastic material, the thermoplastic material, because of its insulating ability, will quench this high voltage spark between the electrode 58 and the mold cavity, and hence the current flow through resistor 59.

Accordingly, a pre-set counter 78 is provided and the voltage drop across resistor 59 due to the current flow resulting from the high voltage spark between the electrode 58 and the mold cavity is coupled thereto by means of conductors 79 and 80. The pre-set counter 78 is adapted to be triggered to start counting, in a manner to be described, the revolutions of the male element 18 of the mold cavity when this signal is quenched by the thermoplastic material.

The pre-set counter 78 is also fed via a conductor 82 by an output signal from a tachometer generator 84 which detects and indicates the revolutions of the mold portion 18.

A pre-set counter 78 and a tachometer generator capable of performing, or capable of being easily adapted to perform, in the above described manner is a Hewlett-packard pre-set counter 5214L and a Hewlett-Packard Tachometer generator 508A, respectively.

The pre-set counter 78 counts a pre-set number of revolutions after being activated in the manner described above, and at that time generates an output signal which is coupled by a conductor 85 to a solenoid 86. The solenoid 86 is coupled to and controls the four-way valve 54 which, in turn, controls the fluid flow to the hydraulic motor 48. The solenoid 86 in response to this signal from the pre-set counter 78 operates the valve 54 to block the flow to the hydraulic motor 48 to stop mold rotation.

It may therefore be seen that with the above described apparatus the precise time that the mold cavity is filled may be instantaneously determined, and the number of revolutions of the rotatable element 18 of the mold cavity precisely controlled to allow the rotatable element to rotate only a predetermined number of revolutions after the mold cavity is filled. Obviously, the same approach applies to the impact mold of FIG. 3 wherein male die 101 impacts plastic material within female block 100 into an impact molded article.

In accordance with the second, and preferred embodiment of the invention, the electrode 58 is replaced by a thermistor of the type shown in FIG. 4 which may be, for example, a Type 51A1 made by Victory Engineering Corporation, or its equivalent. Thermistors are generally encased in glass envelopes, such as the glass envelope 91, and the end of the glass envelope 91 is ground off to correspond to the contour of the mold cavity and to expose the thermistor probe 92 to the thermoplastic material, to provide more positive control.

In FIG. 5, the thermistor 90 is represented by a resistor 90'. The electrodes 93 and 94 of the thermistor 90 (see FIG. 4) are connected in series with the resistor 59 and the power supply 70, which, in the case of the thermistor 90, may be a battery 95. As is well known, thermistors are very temperature sensitive and the resistance thereof changes as the temperature changes. With the thermistor 90 connected in series with the resistor 59 and the battery 95, the voltage drop across the resistor 59 will change due to the change in resistance of the thermistor 90.

As an example of a source of power and resistor which may be used, it was found that a 6-volt battery connected in series with a 10,000 ohm resistor and the thermistor 90 would provide approximately a 400 millivolt signal across the resistor 59 when the mold is filled.

The pre-set counter 78 (see FIG. 1) in this case, is adapted to be triggered to start counting when this 400 millivolt signal is coupled thereto. The pre-set counter 78 counts the number of revolutions of the rotatable element 18 of the mold cavity and generates an output signal to activate the solenoid 86 to, in turn, activate the fourway valve 54 to stop the hydraulic motor 48, in the manner described above.

When using a thermistor 90, it is found desirable to amplify the signal developed across the resistor 59 before coupling it to the pre-set counter 78. In such case, an amplifier 96, such as a Dymec DY–2460A amplifier, is provided. Also, a capacitor 83 is included in series in the connection between the amplifier 96 and the pre-set counter 78 to block the direct current from the amplifier.

A solenoid 98 may also be connected to the four-way valve 54 and to a source of power (not shown) for operating the valve 54 to stop the hydraulic motor 48 independently of the solenoid 86, in the event of malfunction of the mold cavity or for other reasons.

An alternate manner for controlling the continued rotation of the rotatable element 18 of the mold cavity, would be to replace the pre-set counter 78 and the tachometer generator 84 with a time delay relay which is activated by the signal developed across the resistor 59 to, in turn, after a predetermined time delay, couple a source of power to the solenoid 86 to activate the same. It will be apparent to those skilled in the art that the pre-set counter 78 and the tachometer generator 84 could also be replaced by means other than a time delay relay. The above described method and apparatus for detecting the number of revolutions of the male element 18 of the mold cavity after the fill point has been determined is therefore intended to be only representative of one manner in which this may be accomplished.

It will thus be seen that the objects set forth above, among those made apparent from the preceding description, are efficiently obtained and, since certain changes may be made in carrying out the above method and in the constructions set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language might be said to fall therebetween.

Now that the invention has been described, what is claimed as new and desired to be secured by Letters Patent is:

1. A method for molding a thermoplastic article to impart multi-directional orientation to the molecules of the thermoplastic material of said article comprising inserting said thermoplastic material into a mold with a cavity which defines said article while applying a rotational force to one element of said mold, detecting with sensing means inserted within said mold when said mold is filled, terminating said rotational force at a set time after detecting that said mold is filled in accord with the orientation desired, and then opening said mold and removing said article.

2. The method of claim 1 wherein said detecting is performed with an insulated electrode which extends into the cavity of said mold and is spaced therefrom and has a potential applied thereto sufficient to cause a high voltage spark across the space between said electrode and said mold.

3. The method of claim 1 wherein said detecting is performed with a thermistor which extends into the cavity of said mold and has a potential applied thereto to cause current flow in a circuit including said thermistor.

4. The method of claim 1 wherein said rotational force is generated with a hydraulic motor.

5. A method for injection molding a thermoplastic article to impart multi-directional orientation to the molecules of the thermoplastic material of said article comprising injecting molten thermoplastic material into a closed mold with a cavity which defines said article while applying a rotational force to one element of said closed mold, detecting with sensing means inserted within said mold when said mold is filled, then counting with automatic counting means the number of revolutions of said rotating element thereafter, and terminating said rotational force after said element has rotated a set number of revolutions after said mold is filled in accord with the orientation desired, and then opening said mold and removing said article.

6. A method for injection molding a thermoplastic article to impart multi-directional orientation to the molecules of the thermoplastic material of said article, comprising injecting molten thermoplastic material into a closed mold with a cavity which defines said article while applying a rotational force to the male element of said closed mold, detecting with sensing means inserted within said mold when said mold is filled, then counting with automatic counting means the number of revolutions of said male element thereafter and terminating said rotational force after said male element has rotated a set number of revolutions after said mold is filled in accord with the orientation desired, and then opening said mold and removing said article.

7. A method for determining the fill point of a mold cavity having a gate comprising the steps of extending an insulated electrode into the mold cavity at the furthest distance from said gate, applying a sufficient potential between the electrode and the walls of the mold cavity to cause a high voltage spark therebetween so that current flows through a circuit including said electrode and said walls of the mold cavity, and connecting current flow detecting means in said circuit to detect said current flow for indicating when said mold cavity is filled.

8. Apparatus for detecting the fill point of a mold cavity having a gate comprising, in combination; an insulated electrode extending into said mold cavity at the furthest distance from said gate of said mold cavity; a source of power connected in a circuit with said electrode and the walls of said mold cavity for causing a high voltage spark between said electrode and said walls of said mold cavity to cause current flow in said circuit; and means included in said circuit for detecting said current flow in said circuit for indicating when said mold cavity is filled.

9. Apparatus for detecting the fill point of a mold cavity having a gate comprising, in combination; a thermistor extending into said mold cavity at the furthest distance from said gate of said mold cavity; said thermistor being encased in a glass envelope and the end of said glass envelope is ground away to correspond to the contour of the inside surface of said mold cavity and to expose said thermistor, a source of power connected in series with said thermistor; and means included in said circuit for detecting the change in current flow in said circuit due to the change in resistance of said thermistor for indicating when said mold cavity is filled.

10. Apparatus for detecting the fill point of a mold cavity having a gate comprising, in combination; a glass insulated electrode extending into said mold cavity at the furthest distance from said gate of said mold cavity; a source of power connected in a circuit with said electrode and the walls of said mold cavity for causing a high voltage spark between said electrode and said walls of said mold cavity to cause current flow in said circuit; a resistor connected in series in said circuit; and means for detecting the voltage drop across said resistor to indicate when said mold cavity is filled.

11. Apparatus, as claimed in claim 10, wherein said source of power comprises a step-up transformer having a primary winding connected to a 110 v. source and a secondary winding connected in series with said electrode and said resistor.

12. Apparatus for detecting the fill point of a mold cavity and for controlling the rotation of rotatable element of said mold cavity after it is full, said rotatable element of said mold cavity being rotated by hydraulic motor means, said apparatus comprising, in combination: sensing means extending into said mold cavity for sensing when the mold cavity is full, a source of power connected in a circuit with said sensing means for causing current flow in said circuit; hydraulic pump means coupled to said hydraulic motor means for operating said hydraulic motor means; valve means included in said coupling for stopping the rotation of said hydraulic motor means; valve operating means connected to said valve means for activating said valve means to stop said rotation of said hydraulic motor means; current flow detecting means included in said circuit with said sensing means and said source of power; control means coupled to said current detecting means and to said valve operating means, said control means being responsive to said current detecting means to operate said valve operating means after a set time or number of revolutions of said rotatable element after said mold cavity is filled.

13. Apparatus, as claimed in claim 12, wherein said sensing means comprises an insulated electrode extending into said mold cavity.

14. Apparatus, as claimed in claim 12, wherein said sensing means comprises a thermistor extending into said mold cavity.

15. A molding machine for the manufacture of thermoplastic articles having molecules with multi-directional orientation comprising a mold cavity formed of at least two elements, one of said elements being rotatable, means for applying a rotational force to said rotatable element during the filling stroke of said machine and while the molded article solidifies, means for opening and closing said mold, an insulated electrode extending into said mold cavity, a source of power connected in a circuit with said electrode and one of said mold elements which form said cavity for causing a high voltage spark between said electrode and said mold element to cause current flow in said circuit, said high voltage spark being quenched by said thermoplastic when said mold cavity is filled, and means included in said circuit for detecting said current flow in said circuit.

16. An injection molding machine for the manufacture of thermoplastic articles having molecules with multi-directional orientation comprising a mold cavity formed of at least two elements, one of said elements being rotatable, means for applying a rotational force to said rotatable element during the injection stroke of said machine and while the molded article solidfies, a gate for said mold cavity, means for opening and closing said mold, a thermistor extending into said cavity mold at the furthest distance from said gate of said mold cavity, a source of power connected in series with said thermistor for causing a current flow in a circuit including said thermistor, and means included in said circuit for detecting the change in current flow in said circuit due to change in resistance of said thermistor for indicating when said mold cavity is filled.

References Cited

UNITED STATES PATENTS

| | | | |
|---|---|---|---|
| 2,372,177 | 3/1945 | Conner | 264—328 X |
| 2,786,234 | 3/1957 | Beyer | 18—30 X |
| 2,928,037 | 3/1960 | Lawrence | 338—22 X |
| 3,025,568 | 3/1962 | Hardy | 18—30 |
| 3,062,999 | 11/1962 | Brown | 323—68 X |
| 3,133,239 | 5/1964 | Borges | 323—68 X |
| 3,178,901 | 4/1965 | Blackett. | |
| 3,246,210 | 4/1966 | Lorenz | 307—116 X |
| 3,306,964 | 2/1967 | Miller | 18—30 X |
| 3,307,726 | 3/1967 | Cleereman | 264—328 X |

FOREIGN PATENTS 1,288,393  2/1962  France.

JAMES A. SEIDLECK, *Primary Examiner.*

P. E. ANDERSON, *Assistant Examiner.*